Patented Nov. 28, 1933

1,936,944

UNITED STATES PATENT OFFICE

1,936,944

ACID DYESTUFFS OF THE ANTHRAQUINONE SERIES AND A PROCESS OF PREPARING THE SAME

Georg Kraenzlein and Ernst Diefenbach, Frankfort-on-the-Main-Hochst, Germany, assignors to General Aniline Works, Inc., New York, N. Y., a corporation of Delaware No Drawing. Application January 30, 1931, Serial No. 512,490, and in Germany February 6, 1930

13 Claims. (Cl. 260—60)

The present invention relates to new acid dyestuffs of the anthraquinone series and a process of preparing them, more particularly it relates to blue acid dyestuffs of the general formula:

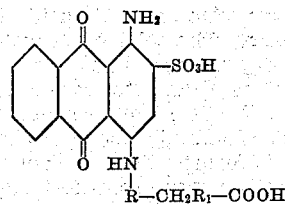

wherein R and $R_1$ represent radicals of the benzene series and the COOH group in the radical $R_1$ occupies the ortho-position to the $CH_2$ group. The benzene radicals R and $R_1$ may contain substituents, such as alkyl, OH, O-alkyl, halogen, COOH. Our new dyestuffs which dye wool and silk blue tints of good fastness properties are obtainable with a good yield by condensing a 1-amino-4-halogen-anthraquinone-2-sulfonic acid of the formula:

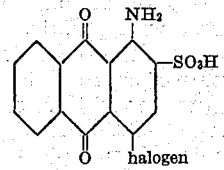

or a salt thereof, with a compound of the formula:

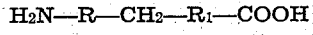

$$H_2N-R-CH_2-R_1-COOH$$

wherein R and $R_1$ represent radicals of the benzene series and the COOH group in the radical $R_1$ occupies the ortho-position to the $CH_2$ group, or a salt thereof, by heating the components in the presence of an acid binding agent and a small quantity of a copper compound.

The new compounds may be used as dyestuffs or as starting materials for the manufacture of other dyestuffs.

The same blue acid dyestuffs are obtainable by condensing a Bz'-aminodiphenylmethane-2-carboxylic acid with a 1-amino-2.4-dihalogen anthraquinone and substituting in the 1-amino-2-halogen-4-arylidoanthraquinones thus obtained the sulfonic acid group for the halogen atom standing in 2-position of the anthraquinone compound, advantageously by treatment with alkali metal sulfites.

We have furthermore found that the blue acid dyestuffs, obtainable as above described, may be converted into new dyestuffs having entirely different properties, by treating them with concentrated sulfuric acid or a similar agent, such as chlorosulfonic acid. The conversion even occurs under very mild conditions of reaction, especially at low temperatures. The blue dyestuffs used as starting materials chiefly yield brown to gray to green dyestuffs. The constitution of the new products has not yet been definitely ascertained, but most probably ring closure occurs by the dehydrating action of the sulfuric acid.

The following examples serve to illustrate the invention but they are not intended to limit it thereto, the parts being by weight unless stated otherwise:

1. 20 parts of 2'-amino-diphenylmethane-2-carboxylic acid—obtainable by splitting up the lactam of ortho-aminobenzoyl-benzoic acid, prepared according to the copending U. S. patent application Ser. No. 336,324 by treating phthalic acid phenylimide in a melt of a mixture of aluminium chloride and sodium chloride at a temperature of 285° C. to 290° C., into the ortho-aminobenzoyl benzoic acid and subsequent reduction, colorless needles, melting at 135° C.–136° C.—are dissolved, while gently heating, in 300 parts of a 5% solution of sodium carbonate. 24 parts of sodium 1-amino-4-bromo-anthraquinone-2-sulfonate and 1 part of finely powdered cuprous chloride are added. The mixture is heated to gentle boiling until the formation of the dyestuff is finished. Thereupon, the dyestuff is precipitated by acidifying the solution with dilute hydrochloric acid or by salting it out by means of sodium chloride. In order to purify the dyestuff, it is redissolved in a dilute sodium carbonate solution, reprecipitated, washed with a 10% solution of sodium chloride and dried at 60° C.–70° C. The dyestuff is thus obtained with a good yield in the form of small violet crystals having a metallic lustre. It dyes wool and silk beautiful blue tints and dissolves in cold concentrated sulfuric acid to a blue solution which, after a short time, turns green and finally passes to brownish-green. When diluting the sulfuric acid solution with water a brownish flaky precipitate is obtained.

2. 38 parts of 1-amino-2.4-dibromo-anthraquinone, 25 parts of 2'-aminodiphenylmethane-2-carboxylic acid, 20 parts of anhydrous potassium acetate, 0.5 part of copper acetate and 0.5 part of copper bronze are mixed with 400 parts by volume of amyl alcohol, and the whole is heated in an autoclave for 20 hours at 150° C., while stirring. After cooling, the condensation product which has separated, is filtered with suction, washed with alcohol and water and dried.

In order to convert the condensation product into the sulfonic acid, 15 parts of the crude condensation product are heated to gentle boiling with 60 parts of phenol, 12 parts of potassium sulfite and 30 parts of water until the dyestuff has become entirely soluble in water. The phenol is removed by steam-distillation, the solution is filtered and the reaction product is precipitated from the filtrate by acidifying. It is identical with the dyestuff described in Example 1.

3. 1 part of the product obtainable by condensation of 1-amino-4-bromo-anthraquinone-2-sulfonic acid with 2'-amino-diphenylmethane-2-carboxylic acid (described in Example 1) is dissolved in a finely powdered state in 10 parts of concentrated sulfuric acid, while stirring and maintaining a temperature 5° C.–10° C. The color of the solution which is at first blue, after a short time, passes to green and finally to brownish green. While well stirring, the solution is poured into cold water, the dyestuff which precipitates in brown flakes is filtered with suction and washed with a 10% solution of sodium chloride until neutral. The dry dyestuff forms a brown powder which easily dissolves in water to an intense reddish brown solution and dyes wool and silk beautiful brown tints.

4. 50 parts of 4'-amino-diphenylmethane-2-carboxylic acid—obtainable by causing 4-chlorobenzoyl-ortho-benzoic acid to react with ammonia according to German Patent No. 234,917 and subsequent reduction; nearly colorless brilliant needles, melting at 174° C.–175° C.—dissolved in 750 parts of water and 38 parts of sodium carbonate, are mixed with 60 parts of sodium-1-amino-4-bromo-anthraquinone-2-sulfonate and 2.5 parts of cuprous chloride. Already after half an hour's gentle boiling the mixture assumes a pure blue coloration and is heated for further 6 hours under reflux in order to terminate the condensation. The dyestuff is isolated and purified according to one of the usual methods and forms a blue crystalline powder. It dyes wool and silk clear pure greenish blue tints.

5. 1 part of the dyestuff obtainable from 4'-amino-diphenylmethane-2-carboxylic acid, described in Example 4, is introduced into 10 parts of concentrated sulfuric acid. It dissolves with a blue coloration which, after stirring for a short time, turns violet. The temperature is gradually raised to 50° C.–60° C. whereby the color of the solution passes to bluish-green with evolution of $SO_2$. The solution is poured into water, filtered with suction, and the solid matter is washed with a dilute solution of sodium chloride until neutral and dried. There is obtained a black powder having a metallic lustre, dissolving in hot water to a blue solution and dyeing wool and silk from an acid bath gray to deep black tints.

6. 20 parts of the product obtainable by condensation of 1-amino-4-bromo-anthraquinone-2-sulfonic acid with 4'-amino-diphenylmethane-2-carboxylic acid, described in Example 4, are dissolved in 200 parts of chlorosulfonic acid and stirred for 20 hours at 15° C. The temperature is then raised to 50° C. in the course of ½ hour, the solution is poured into cold water, the dyestuff which has separated is filtered with suction and washed first with water and then with a 10% solution of sodium chloride until neutral and dried. The dyestuff dyes wool and silk bluish-gray to deep black tints.

7. 36 parts of 3'-amino-diphenylmethane-4'.2-dicarboxylic acid—obtainable by reduction of the 3'-aminobenzophenone-4'.2-dicarboxylic acid, described in German Patent No. 248,838', are dissolved in a solution of 22 parts of sodium carbonate in 500 parts of water and 40 parts of sodium-1-amino-4-bromo-anthraquinone-2-sulfonate and 1 part of cuprous chloride are added thereto. After gentle boiling under reflux for 12 hours the condensation is finished. The dyestuff is isolated and purified by one of the usual methods. It forms a dark blue powder, dissolving in water to a blue solution, and dyes wool and silk clear blue tints.

8. The blue dyestuff obtainable from 3'-aminodiphenylmethane 4'.2-dicarboxylic acid, described in Example 7 is dissolved in 10 times its weight of concentrated sulfuric acid at 5° C.–10° C., while stirring. The color of the solution is at first green and gradually turns violetish brown. By pouring the solution into water, the dyestuff precipitates in the form of green flakes. It is filtered with suction and washed with cold water until neutral; it forms a dark powder which dissolves in water to a green solution and dyes wool and silk bluish green tints.

9. 8 parts of 2'-amino-4'-chloro-diphenylmethane-2-carboxylic acid—obtainable by splitting up the lactam of 2-amino-4-chlorbenzoyl-ortho-benzoic acid, prepared according to the copending U. S. application Ser. No. 336,324 by treating phthalic acid-m-chlorophenylimide in a melt of a mixture of aluminium chloride and sodium chloride at a temperature of 300° C. to 310° C., and subsequent reduction of the CO-group—are heated to gentle boiling for 20 hours in a solution of 5 parts of sodium carbonate in 100 parts of water with addition of 8 parts of sodium-1-amino-4-bromanthraquinone-2-sulfonate and 0.3 part of cuprous chloride.

The reaction product is isolated and purified by one of the usual methods. It forms a dark blue powder having a metallic lustre and dissolves in water to a blue solution. It dissolves in concentrated sulfuric acid to a blue-green solution which, after a short time, turns green and finally passes to brown. By very much diluting the sulfuric acid solution with water, brown flakes precipitate.

10. The blue dyestuff, obtainable from 2'-amino-4'-chloro-diphenylmethane-2-carboxylic acid and described in Example 9, is treated with concentrated sulfuric acid as indicated in Example 3. Thereby the color of the solution which is at first blue green, after a short time, turns green and finally passes to brown and the reaction product precipitates, on dilution with water, in the form of brown flakes.

The product is worked up and there is obtained a dark brown powder which rather difficultly dissolves in water and dyes wool and silk brown tints.

We claim:

1. As a new product, the acid dyestuff of the following constitution:

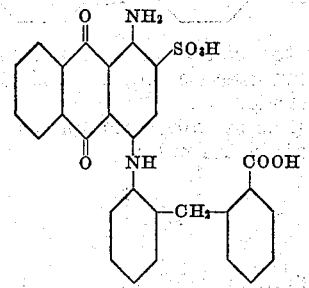

forming small violet crystals of a metallic lustre, dissolving in cold concentrated sulfuric acid to a blue solution, dyeing wool and silk beautiful blue tints.

2. As a new product, the acid dyestuff of the following constitution:

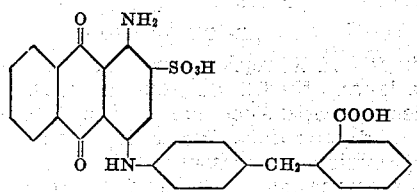

forming a blue crystalline powder, dyeing wool and silk clear pure greenish-blue tints.

3. As a new product, the acid dyestuff of the following constitution:

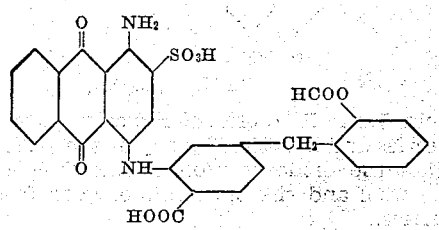

forming a dark-blue powder which dissolves in water to a blue solution and dyeing wool and silk clear blue tints.

4. As new products, the acid dyestuffs obtainable by causing a compound of the formula:

wherein Z stands for OH or Cl to act upon a compound of the following general formula:

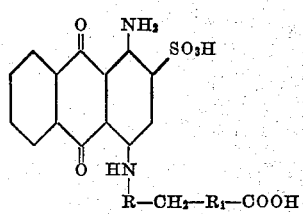

wherein R and $R_1$ represent radicals of the benzene series and the COOH group in the radical $R_1$ occupies the ortho-position to the $CH_2$ group, under mild conditions of reaction particularly with regard to the reaction temperature, dyeing wool and silk chiefly brown to grey to greenish tints.

5. As a new product, the acid dyestuff obtainable by causing concentrated sulfuric acid to act at 5° C.–10° C. upon a compound of the following formula:

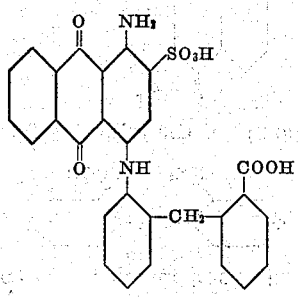

forming a brown powder, easily soluble in water, dyeing wool and silk beautiful brown tints.

6. As a new product, the acid dyestuff obtainable by causing concentrated sulfuric acid to act at 50° C.–60° C. upon a compound of the following formula:

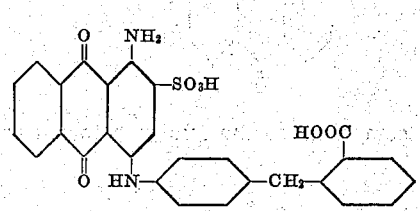

forming a dark powder of a metallic lustre, which dissolves in water to a blue solution, and dyeing wool and silk grayish to deep black tints.

7. As a new product, the acid dyestuff obtainable by causing concentrated sulfuric acid to act at 5° C.–10° C. upon a compound of the following formula:

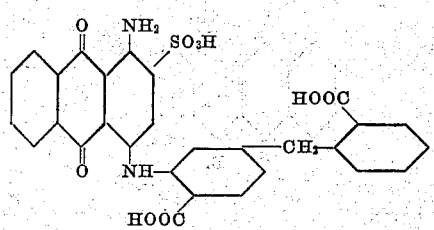

forming a dark powder, which dissolves in water to a green solution, dyeing wool and silk bluish green tints.

8. The process which comprises condensing a compound of the following formula:

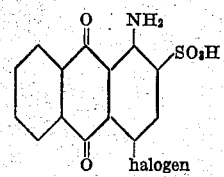

with a compound of the following formula: $H_2N$—R—$CH_2$—$R_1$—COOH wherein R and $R_1$ represent radicals of the benzene series and the COOH group in the radical $R_1$ occupies the ortho-position to the $CH_2$ group, by heating the components in the presence of an acid binding agent and a small quantity of a copper compound.

9. The process which comprises condensing a compound of the following formula:

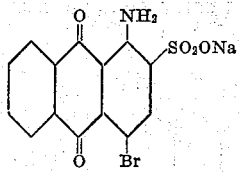

with a compound of the following formula:

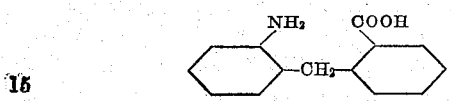

by heating the components in the presence of water, sodium carbonate and a small quantity of cuprous chloride.

10. The process which comprises condensing a compound of the following formula:

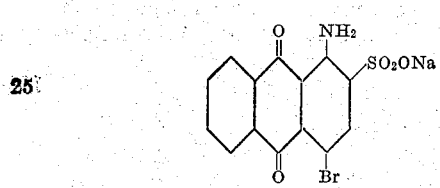

with a compound of the following formula:

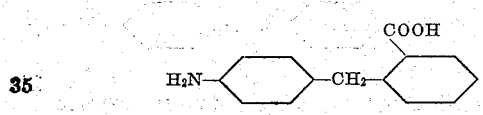

by heating the components in the presence of water, sodium carbonate and a small quantity of cuprous chloride.

11. The process which comprises condensing a compound of the following formula:

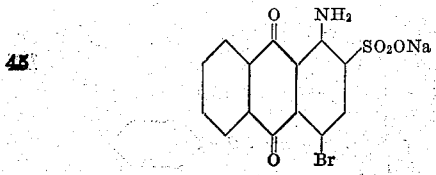

with a compound of the following formula:

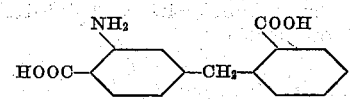

by heating the components in the presence of water, sodium acetate and a small quantity of cuprous chloride.

12. The process which comprises causing a compound of the formula:

wherein Z stands for OH, Cl, to act upon a compound of the general formula:

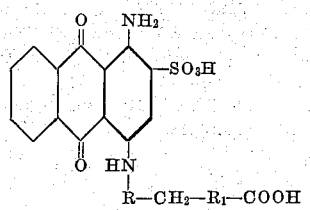

wherein R and R₁ represent radicals of the benzene series and the COOH group in the radical R₁ occupies the ortho-position to the CH₂ group, under mild conditions, particularly with regard to the reaction temperature.

13. As new products, the acid dyestuffs of the following general formula:

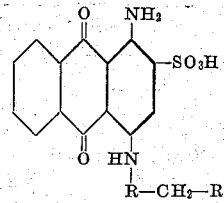

wherein R and R₁ represent radicals of the benzene series and the COOH group in the radical R₁ occupies the ortho-position to the CH₂ group, dyeing wool and silk blue tints of good fastness properties.

GEORG KRAENZLEIN.
ERNST DIEFENBACH.